Patented Feb. 4, 1941

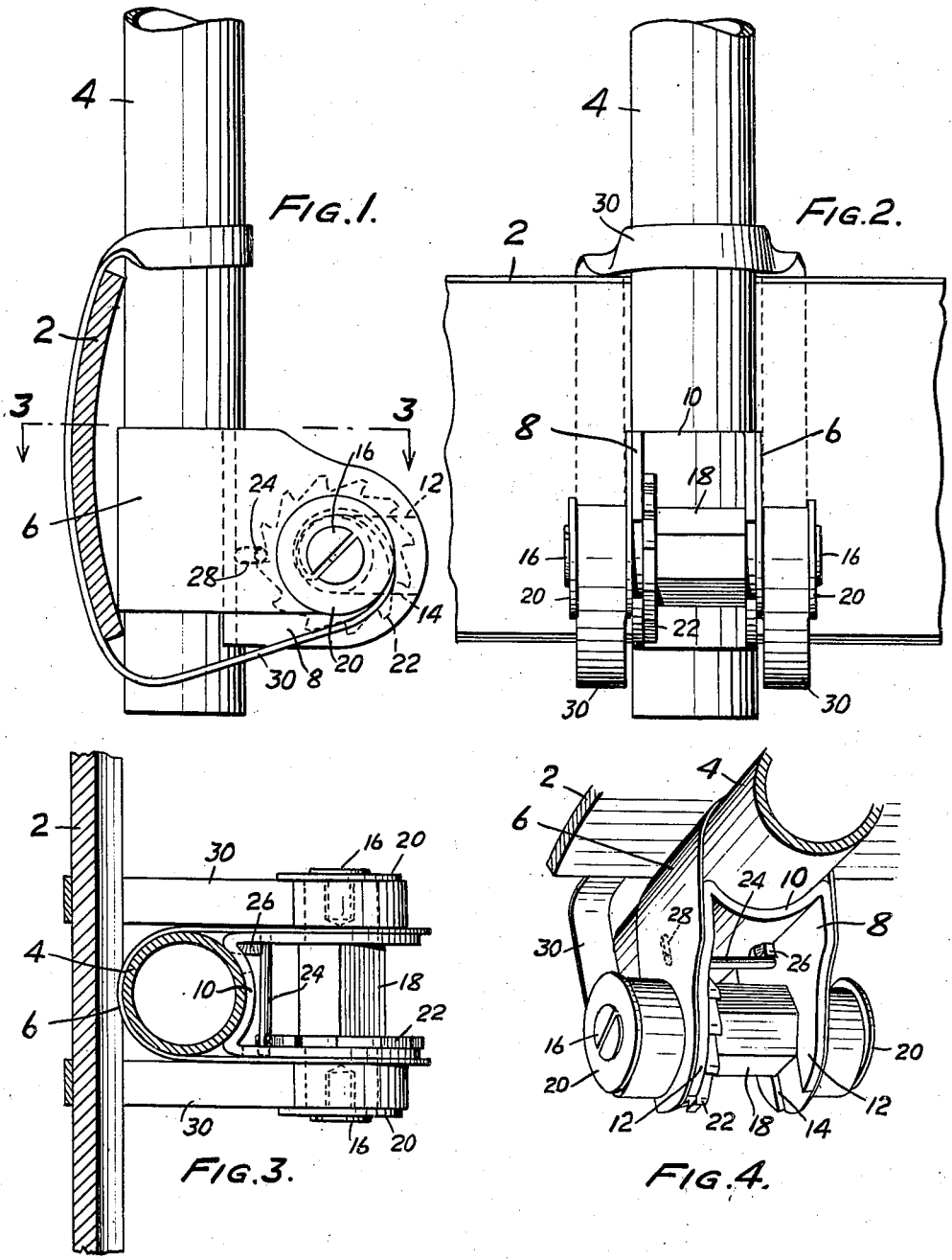

2,230,373

UNITED STATES PATENT OFFICE 2,230,373

CLAMPING MEANS

Merton B. Briggs, Medford, and John R. Haines, Tabernacle, N. J., assignors to Arrow Safety Device Company, Inc., Medford, N. J., a corporation of New Jersey Application March 28, 1939, Serial No. 264,540

4 Claims. (Cl. 24—68)

This invention relates to a clamping means, particularly designed for securing an accessory such as a fog lamp, license plate holder, grille guard, or the like to the bumper of an automobile. The bumpers of present day automobiles are of such divergent types that it has been difficult to standardize on any type of clamping means which would be adapted to secure accessories to the bumpers of various automobiles, and it is usually necessary to supply with any accessory to be located on a bumper some special clamping means adapted to the bumper to which the accessory is to be secured. It is the object of the present invention to provide a clamping means which is of an adjustable nature designed to be used on at least the great majority of bumpers on cars now on the market.

The above object and specific objects relating to details of the invention will be apparent from the following description, read in conjunction with the accompanying drawing, in which:

Figure 1 is a vertical sectional view through the bumper of an automobile showing the use of the improved device for securing thereto an accessory of the type indicated above;

Figure 2 is a rear elevation of the same;

Figure 3 is a horizontal section taken on the plane the trace of which is indicated at 3—3 in Figure 1; and Figure 4 is a fragmentary perspective view illustrating certain details of the clamping device.

There is illustrated in the drawing at 2 in rather conventionalized fashion a bumper of an automobile to which the clamping device may be applied. This bumper is shown in a simple form, but it will be obvious from the following description that the device may be applied to bumpers irrespective of substantial variations in details of construction and ornamentation. The various bumpers used at the present day generally differ from each other in height, convexity, upper and lower flanges, etc., but usually present, as in the case of the bumper illustrated, rear edges which are substantially in vertical alignment, so as to serve to maintain in vertical position a rod, tube, or the like such as indicated at 4, which forms part of or supports an accessory. It will be obvious, however, that the device may even be applied to bumpers which do not have the characteristic just indicated, for example, bumpers of circular vertical cross-section, the clamping means in that case serving to hold the accessory in frictional fashion against deviations from predetermined position.

The clamp is also adapted with minor variations for securing accessories having portions of various shapes adapted for engagement with a bumper. Usually, however, the supporting posts of such accessories are circular in section, as illustrated by the tubular member 4, which may support, for example, a fog lamp or bracket or the like, or which may be part of a grille or bumper guard.

The clamping device per se comprises in its preferred form a U-shaped sheet metal strap member 6 embracing the sides of a U-shaped member 8 of relatively heavy metal provided with a suitable socket 10 to engage the support 4. Each leg of the member 8 is preferably bifurcated to provide tongues 12 and 14 defining between them a slot for the reception of a spindle 16, which is journalled in circular openings in the legs of the strap 6. The spindle 16 is formed at its central portion with a polygonal enlargement 18 adapted to be gripped and turned by means of a wrench. The ends of the spindle are slotted and they are provided with flanges 20 preferably containing openings having cross-bars which may be forced into the ends of the slots for the purpose of providing after assembly a substantially unitary member. These flanges tend to prevent theft by preventing prying off of the straps 30.

The spindle is additionally provided with a ratchet 22 with the teeth of which there is adapted to engage a detent in the form of a pin 24 secured in the member 8, for example, by means of a tongue 26 formed from that member, and adapted to be guided for limited movement in a slot 28 therein. This construction makes it possible to turn the spindle 16 in one direction by the application of a wrench to its portion 18, but prevents reverse rotation of the spindle unless the detent pin 24 is forcibly removed from engagement with the ratchet.

A metallic flexible band indicated at 30 is adapted to be looped about the post 4, which is engaged by the strap 6 and the member 8 and is adapted to be passed in front of the bumper 2 and have its ends wound upon the spindle 16, the ends being inserted within the slots in the ends of the spindle.

The use of this clamping means will be quite evident from the figures. By supplying a sufficient length of the band 30 it will be obvious that it may be drawn about the front of bumpers of various types when the accessory post 4 is located in contact therewith. By securing its ends in the spindle slots and rotating the spindle by means of a wrench, the arrangement may be tightened up to securely hold the accessory post in engagement with the bumper. Free movement of the band is prevented by the ratchet 22. It may be pointed out that the strap 6 is primarily for convenience in holding the elements during assembly and for stabilization of the band holding means, since when tightening takes place the spindle bears upon the bottoms of the slots in the member 8 and the actual clamping which occurs is effected on one side of the post 4 by the bumper and on the other side of the post by the upper loop of the band 30 and the member 8. The strap 6 prevents separation of the upper end of member 8 from the post.

The band 30 may be plated with chromium so as to give a finished appearance to the assembly. The major portions of the clamping means are hidden behind the bumper in an inconspicuous place.

It will be clear that variations may be made in the specific embodiment of the invention without departing from its scope as defined in the following claims.

What we claim and desire to protect by Letters Patent is:

1. In combination, a post member, an element engaging and extending transversely to the post member, and clamping means for securing the post member and element together, the clamping means comprising a looped flexible band of which the loop embraces the post member and has its sides pass alongside each other about said element to which the post member is secured, and means carried by said post member for taking up both ends of the band.

2. In combination, a post member, an element engaging and extending transversely to the post member, and clamping means for securing the post member and element together, the clamping means comprising a looped flexible band of which the loop embraces the post member and has its sides pass alongside each other about said element to which the post member is secured, and means carried by said post member for taking up both ends of the band, said last means comprising a shaft to which the ends of the band are secured.

3. In combination, a post member, an element engaging and extending transversely to the post member, and clamping means for securing the post member and element together, the clamping means comprising a looped flexible band of which the loop embraces the post member and has its sides pass alongside each other about said element to which the post member is secured, and means carried by said post member for taking up both ends of the band, said last means comprising a shaft to which the ends of the band are secured, and detent means for preventing retrograde movement of said shaft after tightening has taken place.

4. In combination, a post member, an element engaging and extending transversely to the post member, and clamping means for securing the post member and element together, the clamping means comprising a flexible member engaging the post member and extending about said element, and means carried by the post member for tightening said flexible member about said element, the last named means comprising an assembly slidably mounted on said post and including a shaft to which the flexible member is secured, said assembly embracing the post through a substantial length thereof to avoid tilting of the assembly relative to the post when the flexible member is tightened.

MERTON B. BRIGGS.
JOHN R. HAINES.